United States Patent
Beach

(10) Patent No.: US 7,077,308 B2
(45) Date of Patent: Jul. 18, 2006

(54) COMPLETE GIFT WRAP

(76) Inventor: Lisa Marie Beach, 4323 Pompey Center Rd., Manlius, NY (US) 13104

( * ) Notice: Subject to any disclaimer, the term of this patent is extended or adjusted under 35 U.S.C. 154(b) by 274 days.

(21) Appl. No.: 10/458,863

(22) Filed: Jun. 11, 2003

(65) Prior Publication Data

US 2004/0026488 A1    Feb. 12, 2004

Related U.S. Application Data

(60) Provisional application No. 60/387,832, filed on Jun. 11, 2002.

(51) Int. Cl.
B65D 65/38    (2006.01)
(52) U.S. Cl. ...................... 229/87.19; 383/66
(58) Field of Classification Search ................ 383/66, 383/118, 87; 229/87.18, 87.1, 87.19
See application file for complete search history.

(56) References Cited

U.S. PATENT DOCUMENTS

| | | | | |
|---|---|---|---|---|
| 2,119,490 A | * | 5/1938 | Pellerin | ........................ 383/87 |
| 2,574,345 A | * | 11/1951 | Montgomery | ............... 206/494 |
| 2,683,262 A | * | 7/1954 | Foss | ............................... 2/457 |
| 3,109,474 A | * | 11/1963 | Levi | ........................... 150/158 |
| 3,422,867 A | * | 1/1969 | Wu | ............................. 383/66 |
| 4,010,785 A | * | 3/1977 | Patik | ........................... 383/87 |
| 4,036,417 A | * | 7/1977 | Traphagan | ................... 294/138 |
| 5,004,144 A | | 4/1991 | Selga | |
| 5,013,068 A | | 5/1991 | Maldonao | |
| 5,092,630 A | | 3/1992 | Ostrowski | |
| 5,392,983 A | * | 2/1995 | Clarke-Bolling et al. | 229/87.19 |
| 5,407,125 A | | 4/1995 | Yates et al. | |
| D359,452 S | | 6/1995 | Hauck | |
| 5,456,062 A | | 10/1995 | Wechsler | |
| 5,743,458 A | | 4/1998 | French | |
| 5,904,289 A | | 5/1999 | Hagan | |
| 5,934,548 A | | 8/1999 | Kenyon | |
| 5,979,744 A | * | 11/1999 | Brigleb | ................... 229/87.01 |

OTHER PUBLICATIONS

GiFabrique ® Fabric Gift Wrap using flap, loop and ribbon, 4 Website pages (undated), www.gifabrique.com.
Stretchable Book Cover Package Front and Back, and 3 Photos of Product (1998).

* cited by examiner

Primary Examiner—Jes F. Pascua

(57) ABSTRACT

An improved time saving integrated reusable gift wrap. The fabric gift wrap is made of stretch fabric and is sewn to fit specific size boxes or packages. This gift wrap is comprised of two sleeves; the top surface being a flat surface and the bottom having an opening to insert a box or package. There is an underlay as to hide the box completely. A ribbon trim is sewn on the outer sleeve and then wrapped around the box completely hiding the opening and tied into a bow.

4 Claims, 3 Drawing Sheets

COMPLETE GIFT WRAP

CROSS REFERENCE TO RELATED APPLICATIONS

This application claims the benefit of PPA Application NR 60/387,832, filed Jun. 11, 2002 by the present inventor.

BACKGROUND OF INVENTION

1. Field of Invention

The present invention relates to a time saving gift-wrap, specifically to a sewn, ready-made, reusable, stretchable fabric gift-wrap.

2. Discussion of Prior Art

Originally traditional gift-wrap was comprised of purchasing multiple items such as paper, tape and a ribbon and an adequate flat surfaced space to create a completed gift-wrap. Cutting the paper, folding the paper around the box, folding around the corners of the box, folding in the ends of paper to make clean edges, taping flaps and wrapping the ribbon around the box. This is a time consuming process and almost always left you with unused scraps. Other inventions have tried to solve problem of waste by using stretchable fabrics that are precut. Objects larger than the fabrics were wrapped by stretching the fabric around the object and sealed by fasteners or loops. Prior Patents do not solve the inherent problems of the time and space needed for wrapping a gift and do not provide a thin, smooth aesthetic presentation.

DESCRIPTION OF PRIOR ART

U.S. Pat. No. 5,004,144 issued on Apr. 2, 1991 to Betty J. Selga describes a Reusable Fabric Gift Wrap using hook and loop material to fasten the wrap securely. Selga discloses no mention of a stretch fabric.

U.S. Pat. No. 5,407,125 issued on Apr. 18, 1995 to Helen Yates et. al. Describes Reusable Wrap formed of a fabric with areas of hook and loop material to provide for a closure.

U.S. Pat. No. 5,743,458 issued on Oct. 23. 1996 to Judith A. French describes a stretchable fabric gift-wrap, which uses elastic bands to secure the material around the object to be wrapped. It also describes a sleeve of fabric that is open on one or both ends and uses loops to close the wrap.

U.S. Pat. No. 5,904,289 issued on May 18, 1999 to Laura J. Hagen describes a stretchable gift-wrap which can adapt to fit various size boxes. It also goes on to describe a releasable flexible hook and loop type fasteners, which must be taken off for washing and reapplied.

U.S. Pat. No. 5,934,548 issued on Aug. 10, 1999 to Cynthia Kenyon describes a reusable gift-wrap comprising of an expandable sleeve. The sleeve is longer than the gift and the end is folded over and retained by using Velcro tabs.

OBJECTS AND ADVANTAGES

Accordingly, several objects and advantages of my invention are, it solves the inherent problems of saving time, eliminating the need for a large flat surfaced space, ease of use for all ages, it requires no fastening means, reusable and enhances the appearance of a wrapped gift.

SUMMARY

It is the principle object of the invention to provide a product for wrapping gifts that is complete within itself, easier to apply, faster, and requires limited space.

Another object of this invention is to provide a sewn, ready-made stretchable box wrap, which in itself will provide a fitted, neat and decorative gift-wrap for various size boxes. It is also the object of this invention to provide improved elements and arrangements of this invention which are inexpensive, dependable, reusable, and will enhance the appearance of a gift box.

Another object of this invention is to provide a gift-wrap that is reusable without sacrificing the aesthetic qualities.

DRAWINGS

DRAWING REFERENCE NUMBERS

| | |
|---|---|
| 2. | box wrap |
| 2A. | underside or back of box wrap |
| 4A. | ribbon |
| 4B. | ribbon secure point |
| 6. | stretchable fabric |
| 8. | notches |
| 10. | fabric folds |
| 12. | lateral edges |
| 14. | corner seams |
| 16. | lateral seams |
| 18. | gift box |
| 22. | overlap |
| 22A | underlay |
| 23. | sleeve |
| 24. | outer sleeve |
| 26. | right side (pattern side) |
| 28. | wrong side |

DETAILED DESCRIPTION-PREFERRED EMBODIMENTS

The present invention relates to the method of making a sewn, ready-made, reusable, complete fabric gift wrap for boxes that will save time in completing the task of gift wrapping. In addition the reusable gift box wrap is made of a stretchable fabric. The preferred embodiment of this invention is shown in FIG. 1 and FIG. 2.

Figure 1:
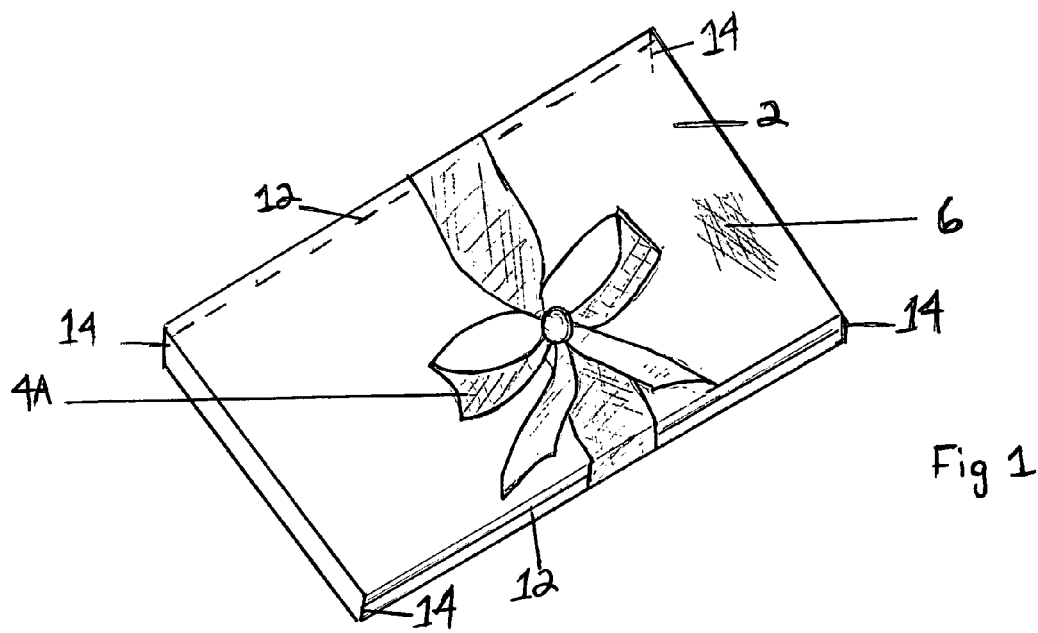
FIG. 1 is a perspective view of the front of the box wrap complete with ribbon tied.

FIG. 1 the ready made box wrap 2 using a decorative pattern stretchable fabric 6 is shown complete with ribbon 4A. The box wrap 2 is made with stretchable fabric 6 and sewn at both lateral edges 12. The corners are also sewn 14.

Figure 2:
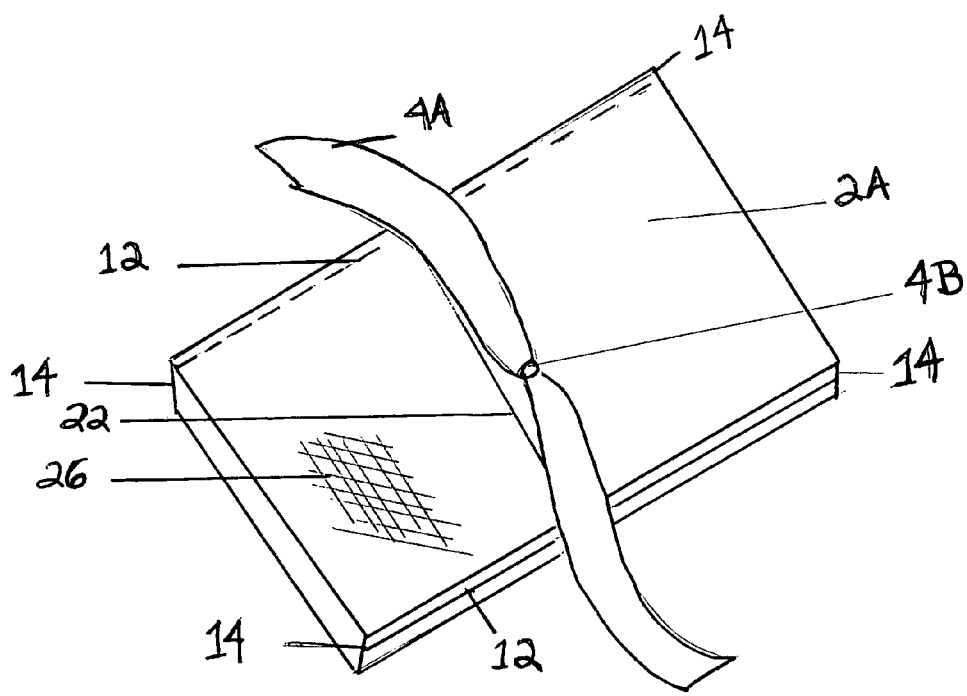
FIG. 2 is a perspective view of the back of the box with the gift-wrap encasing the whole box with the ribbon attached.

FIG. 2 reveals the back or underside 2A of the box wrap 2 with the ribbon 4A secured on the outer sleeve 24 at point 4B.

The method of making the box wrap 2 is illustrated in FIGS. 3–7.

Figure 3:
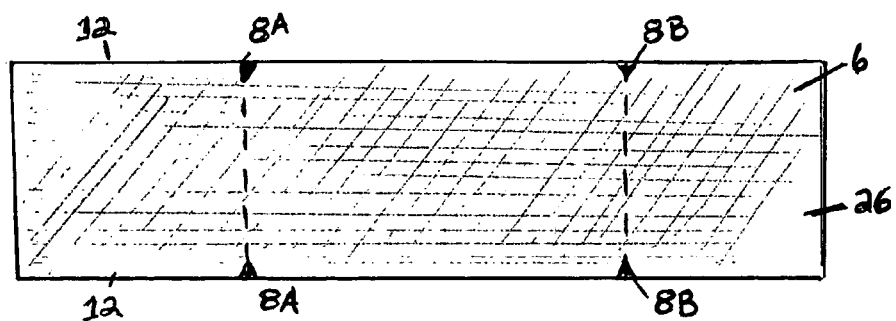
FIG. 3 is a perspective view of a rectangular sheet of fabric with the right side of fabric facing up.

FIG. 3 shows a rectangular piece of stretchable material 6 with the pattern side or right side 26 of fabric facing up. The fabric is folded at the notches 8A, 8B inward to the body of the fabric.

Figure 4:
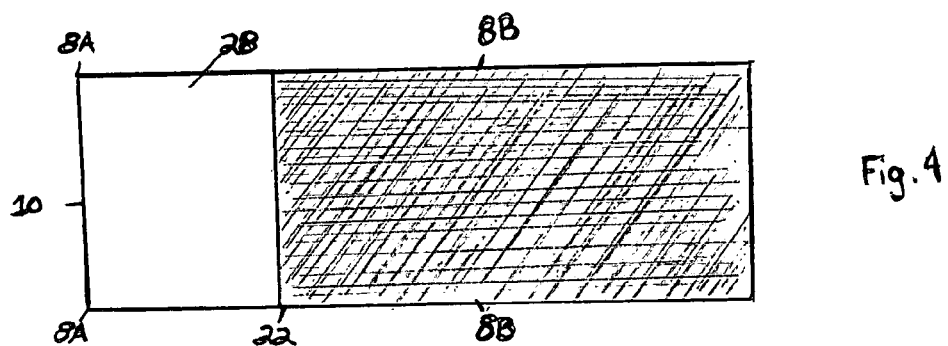
FIG. 4 is a perspective view of the fabric folded on one side, fold is at notches.

FIG. 4 Shows the fabric folded at both 8A notches into the center of the fabric body.

Figure 5:
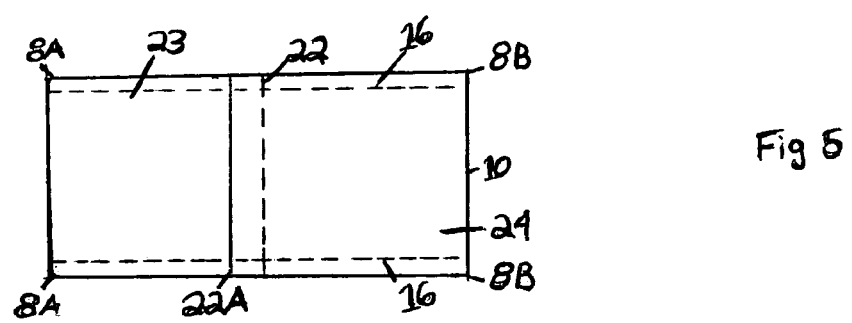
FIG. 5 is a perspective view of the fabric folded with overlap; wrong side of fabric is facing up.

FIG. 5, the second fold is made at the notch 8B, this portion of fabric is approximately 2" longer creating the overlap 22 needed to hide the opening, or point on entrance of the gift box 18. Both lateral sides 12 are then sewn forming sleeves 23 and 24.

Figure 6A:
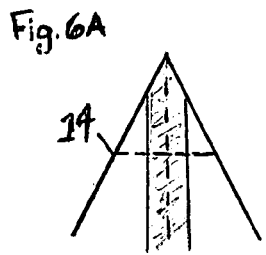
FIG. 6A is a fragmented view of one of the corner seams flattened and sewn.

FIG. 6A Shows the seams are then flatten and the corners are then sewn across. This process is repeated until all four corners have been sewn.

Figure 6B:
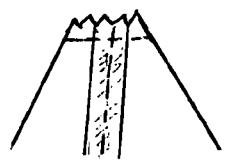
FIG. 6B is a fragmented view of the corner cut above the seam.

FIG. 6B Shows the corner has been cut above the corner seam 14. This is repeated on all the remaining corners. This process creates a neater box fit at the corners.

Figure 7A:
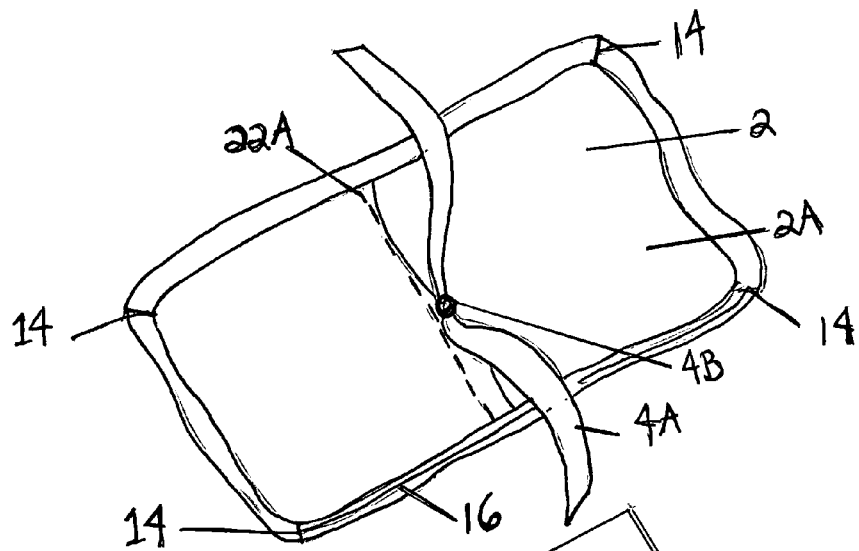
FIG. 7A is a perspective view of the box wrap turned right side out and ribbon sewn on the outer sleeve.

FIG. 7A Illustrates the box wrap 2 after it is turned right side out. The overlap 22 becomes the underlay 22A. The ribbon 4A is sewn on at point 4B.

Figure 7B:
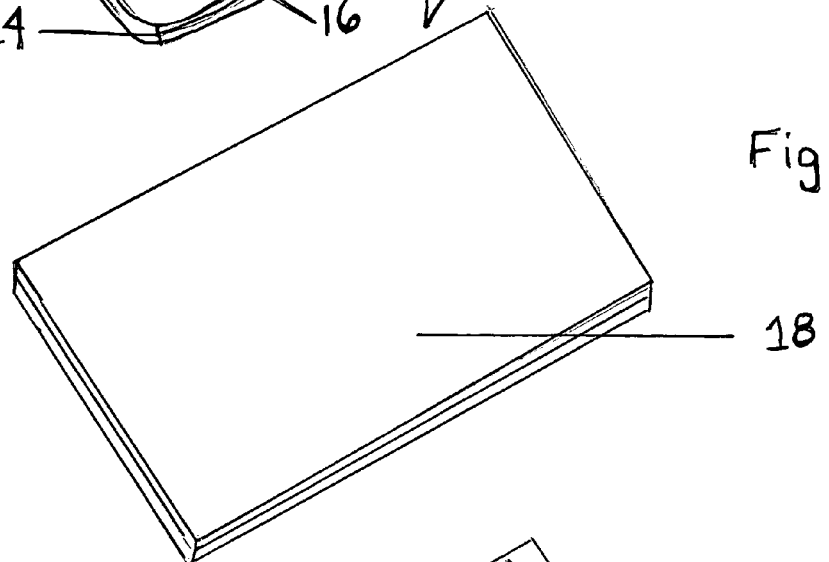
FIG. 7B is a perspective view of a typical shirt gift box.

FIG. 7B shows a typical shirt gift box 18. FIGS. 7A and 7B depict the size difference between the box wrap 2 and the shirt box 18. The box wrap 2 is always smaller then the gift box 18 to provide a snug fit.

Figure 8:
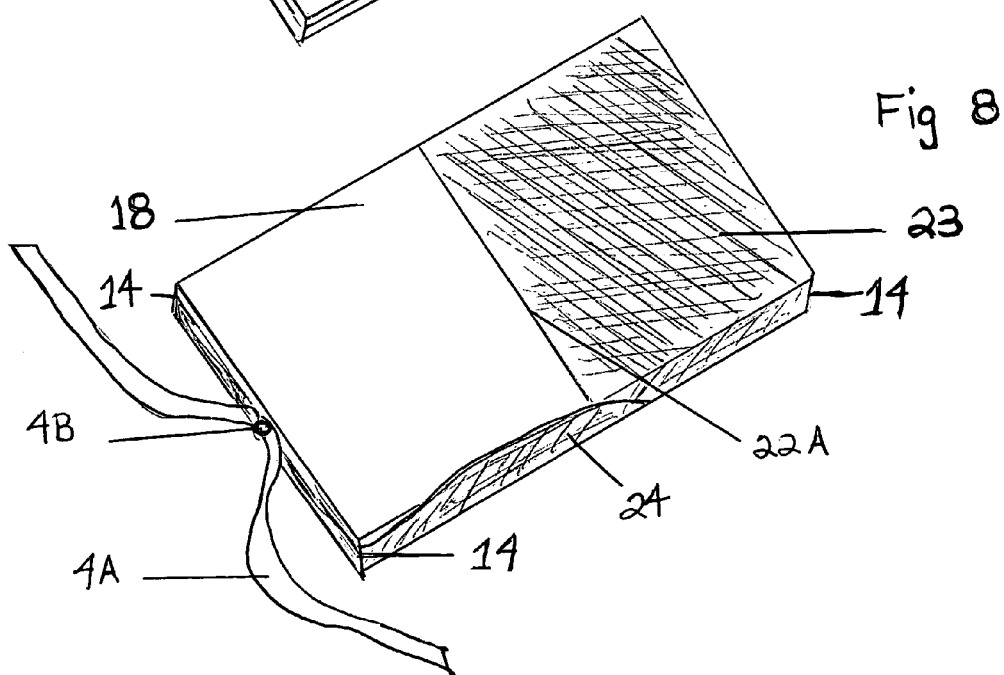
FIG. 8 is a perspective view of one sleeve on the gift box and the second sleeve being stretched over the other portion of the box.

FIG. 8 demonstrates the method of putting the box wrap 2 on the gift box 18. It shows sleeve 23 of the box wrap 2 on the box 18 as the outer sleeve 24 is being stretch around the other end of the gift box 18.

FIGS. 1 and 2 depict the finished present invention.

OPERATION OF INVENTION

To use the fabric box wrap, the following steps should be taken.
1. Place gift box vertically.
2. Put sleeve 23 of box wrap 2 over the end of the gift box 18 and pull towards the middle of the gift box 18.
3. Take outer sleeve 24 and stretch it over the other end of the gift box 18.
4. Wrap ribbon 4A around the gift box 18 and tie a bow.

DESCRIPTIONS AND OPERATIONS OF ALTERNATIVES

1. Corner seams could be deleted.
2. Gift wraps could be used for items without boxes i.e. CDs, books, packaged items.

ALTERNATE EMBODIMENTS

1. The opening can be changed to various placements of the box wrap.
2. The overlap 22 of fabric would not be sewn past the center creating more of a flap than an underlay. This would be beneficial when wrapping square boxes or large rectangular boxes. It would be easier for a person to insert a square or rectangular gift box and tuck the flap under.
3. Ribbon or trim placement and design can be changed or altered.
4. Seams may be altered at various locations on the gift box. Example; bottom edge of a gift box.
5. Corner seams could be deleted for flat gifts such as CD cases.
6. Box wraps could be used for items other then boxes. examples: cd cases, books, plastic packaged items, etc.
7. Ornamental treatments may be added for esthetic presentation.

The reusable gift wrap of the present invention is an integrated and self-contained gift wrap, requiring no fasteners of any sort. The gift wrap of the present invention is made from a rectangular unitary piece of stretchable fabric of predetermined size. The fabric is cut according to specific measurements of standard-size gift boxes to produce a tight-fitting wrapped gift. The piece of fabric is folded inward approximately ¼ of the total length of the fabric piece from each adjacent ends as to form two sleeves with a predetermined underlay at a center position. The fabric is then sewn along parallel sides. The fabric is then oblate so that the seam is in the middle and the two corners form points, which are then sewn across approximately 1" from the top of said points, respectively. This process is repeated on the adjacent side. The fabric is then turned right side out and, optionally, a ribbon trim is sewn on the outer sleeve of the gift wrap. For flat boxes or packages, the corners are not sewn.

In operation, with respect to a gift box, one side of the gift box would be inserted through the opening of the gift wrap and into one end of the wrap, and then fitted into the corners. The other end of the gift wrap would then be stretched over an opposite side of the box. The underlay serves to hide the opening where the box is inserted. The ribbon is pulled around the gift box and tied into a bow, hence requiring no buttons, snaps, hooks, loops, tape or other fasteners.

The design of the complete gift wrap with sewn seams, fitted corners, an underlay hiding the opening and the ribbon sewn directly to the gift wrap, are elements that have not been seen.

CONCLUSION

In summary, the reader will recognize the benefits of this new, improved fabric gift wrap. Not only is it reusable but the ease with which it can be used makes it possible for anyone to wrap a gift box beautifully in literally one minute.

While the above description contains specifications for a gift box, variations on the same basic idea are also unique. The extent of this invention should be judged not by the embodiments illustrated but rather their legal equivalents.

I claim:
1. A gift wrap made by the process comprising the steps:
a) providing a unitary rectangular piece of fabric having first and second opposed parallel lateral edges and first and second opposed side edges perpendicular to the lateral edges,
b) laying the first side edge along a center line of the rectangular piece of fabric perpendicular to the lateral edges to form a first fabric fold,
c) laying the second side edge past the center line forming an underlay with the first side edge and a second fabric fold, d) forming lateral seams by sewing along the first and second lateral edges to form sleeves on opposing sides of the underlay,
e) aligning a portion of the lateral seam with a portion of an adjacent fabric fold and forming a corner seam by sewing perpendicular to the aligned lateral seam and fabric fold,
f) repeating step e) with the remaining portions of the lateral seams and respective adjacent portions of fabric folds,
g) inverting the gift wrap such that the lateral seams and the corner seams are located on the interior.

2. The gift wrap of claim 1, wherein the fabric above vertical corner seam is cut away.

3. The gift wrap of claim 1, further comprising of a trim element mounted at various positions on said gift wrap.

4. The gift wrap of claim 1, wherein said trim element is a ribbon.

* * * * *